March 29, 1960  G. V. WOODLING  2,930,635
FLUID COUPLING CONNECTION WITH CONTRACTIBLE SLEEVE
Filed Feb. 4, 1957

INVENTOR.
George V. Woodling.

United States Patent Office 2,930,635
Patented Mar. 29, 1960

2,930,635

FLUID COUPLING CONNECTION WITH CONTRACTIBLE SLEEVE

George V. Woodling, Rocky River, Ohio

Application February 4, 1957, Serial No. 637,917

2 Claims. (Cl. 285—341)

My invention relates in general to a coupling connection for a tube and more particularly to a coupling connection which requires no flaring of the tube to make the connection.

An object of my invention is the provision of a clamping sleeve having an internal shoulder against which the end of the tube abuts, taken in combination with a contractible biting edge means to bite the tube and hold same therein when the coupling members are connected together.

Another object is the provision of a coupling connection which may be disassembled without materially bending the tubing when making such disassembly.

Another object is the provision of a sleeve having an annular tube supporting surface spaced rearwardly from the biting edge means to support the tube against vibration.

Another object is the provision of a contractible sleeve having internal biting edge means to make an indentation in the tube of a predetermined depth.

Other objects and a fuller understanding of my invention may be had by referring to the following description and claims, taken in conjunction with the accompanying drawing, in which:

Figure 1:
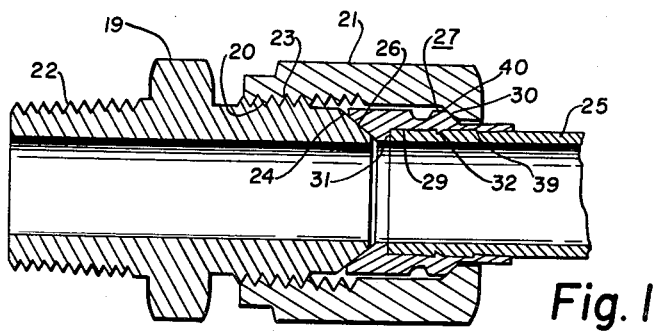
Figure 1 is a longitudinal cross-sectional view of a coupling connection and a clamping sleeve embodying the features of my invention.
Figure 2:
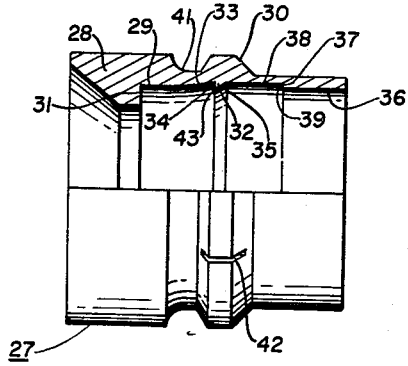
Figure 2 is an enlarged side view of the clamping sleeve, the upper portion being shown in section.

With reference to Figure 1 of the drawing, my invention is shown as being applied to a tube fitting or coupling device comprising a first coupling member 19, a tube 25 adapted to be connected thereto, a clamping sleeve 27 surrounding the tube 25, and a second coupling member 21 comprising a nut which is adapted to press or contract the clamping sleeve 27 inwardly against the tube. The left-hand end of the first coupling member 19 is provided with threads 22 which are usually in the form of pipe threads for engaging a threaded opening in a cylinder, valve, pump or other fluid connecting device. The right-hand end of the coupling member 19 is provided with male threads 20 to which is threadably attached the nut 21 having female threads 23. The right-hand end of the coupling member 19 is provided with a beveled abutment end 24. The left-hand end of the clamping sleeve 27 comprises an annular forward end portion 28 having an internal conical surface 26 which abuts against the beveled abutment end 24 of the coupling member 19 for making a fluid seal therewith.

The sleeve 27 has an inner bore 29 closely surrounding the tube 25. The inner bore 29 of the sleeve terminates in an abutment shoulder 31 at the forward end of the sleeve. Spaced rearwardly of the abutment shoulder and internally of the bore is a biting rib 32 having a sharp inner edge 43 to bite into the tube. The rib 32 has a rearward tapering side 35. The bore 29 is provided with a gradually tapering recess 33 in front of the rib 32 in order to provide a stepped edge 34 on the forward side of the rib 32. At the rearward end of the sleeve, the bore has an annular tube supporting surface 36 which closely surrounds the tube for supporting same against vibration. The supporting surface 36 is spaced rearwardly of the biting rib 32. The inner bore has an annular recess 38 between the supporting surface 36 and the rib 32. The recess 38 at its forward end terminates at the rearward tapering side 35 of the rib and at its rearward end terminates in a stepped edge or shoulder 37, thereby producing a secondary biting edge 39 which may form a secondary grip with the tube.

Figure 3:
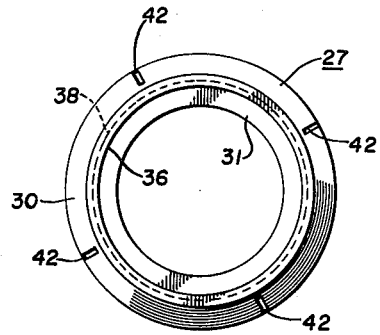
Figure 3 is a view of the clamping sleeve in Figure 2 looking at the rearward end thereof.

The outside surface of the sleeve comprises an external camming surface 30 against which the clamping surface 40 of the nut engages to contract the sleeve about the tube and force the biting rib 32 against the tube to hold same against longitudinal removal therefrom. The sleeve has an external annular groove 41 between the forward end portion 28 thereof and the clamping surface 40. To aid in contracting the sleeve, a plurality of longitudinal extending slots 42 pass through the clamping surface 40 and terminate at the external annular groove 41 (see Figure 3 which shows four of such longitudinal slots).

In making an assembly with my invention, it is not necessary to flare the end of the tube. The tube is merely inserted inside of the bore of the sleeve 27 until the end of the tube abuts the shoulder 31, after which the nut 21 is simply turned to contract the sleeve against the tube with the internal rib 32 making an indentation in the tube for a predetermined distance. Preferably the rib 32 may be about .012 to .020 inch deep. Upon tightening of the nut 21, the secondary biting edge 39 also is pressed toward the tube for making a secondary engagement therewith. The rearward internal supporting surface 36 supports the tube against vibration. The nut 21 when turned tight forces the conical surface 26 at the forward end of the sleeve tightly against the beveled abutment end 24 of the coupling member 19 for making a fluid seal therewith.

In disassembling the fitting after the nut is completely unscrewed, the sleeve which is now attached to the tube may be removed from the beveled abutment end 24 without materially bending the tube. Of course, the conical engagement between the forward end of the sleeve and the rearward end of the coupling member 19 may be substantially normal or perpendicular to the axis of the tube, so that the sleeve with the tube attached thereto may be removed without bending the tube whatsoever. However, the conical surface as shown works very satisfactorily.

The clamping sleeve may be made of material which is harder than the tubing so that the rib 32 may readily make an indentation in the tube for making a good connection. The depth of the stepped edge or shoulder 37 may be the same as the depth of the rib 32. The diameter of the bore 29, the sharp inner edge 43 of the rib 32, and the supporting surface 36 may be of the same diameter before the sleeve is contracted. The inner bore of the sleeve is such that the rib 32 and the stepped edge 37 constitute a plurality of biting edge means, with the supporting surface 36 supporting the tube in rear of the biting edge means.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A coupling connection for a tube comprising, first and second coupling members adapted to be connected together, said first coupling member having a seat, said second coupling member having an internal clamping surface, a clamping sleeve mounted in the second coupling member and having an inner bore to receive said tube, said sleeve comprising a continuous one-piece annular body and having a forward end portion to engage said seat on the first coupling member to make a fluid seal therewith, said sleeve having internally thereof an abutment shoulder against which the end of the tube abuts, said inner bore of said sleeve having biting edge means including at least one substantially V-shaped rib of a fixed depth and opposed fixed side wall means, said bore between said abutment shoulder and said biting edge means comprising a first bore portion and a second bore portion, said first bore portion disposed next adjacent said biting edge means and having next adjacent the forward side of the biting edge means a forward bore wall of a diameter substantially the same as the root diameter of said biting edge means, said second bore portion disposed between said abutment shoulder and said first bore portion and comprising substantially a cylindrical surface closely receiving the end of the tube, the longitudinal extent of said first bore portion being greater than the longitudinal extent of said at least one substantially V-shaped rib, said sleeve next adjacent the rearward side of said biting edge means having a rearward bore portion, said rearward bore portion having a rearward bore wall of a diameter substantially the same as the root diameter of said biting edge means, the longitudinal extent of said rearward bore wall being as great as the longitudinal extent of said at least one substantially V-shaped rib, said sleeve having an external surface and including an external cam surface against which said clamping surface of said second coupling member engages to contractibly force said biting edge means and said forward bore wall and said rearward bore wall on opposite sides thereof toward said tube, said external cam surface having a rearward end overlying said rearward bore wall, said external cam surface and said abutment shoulder axially spaced apart and fixedly disposed in an axial direction with respect to each other and preventing foreshortening of said sleeve to cause said biting edge means and said forward bore wall and said rearward bore wall on opposite sides thereof to contractibly move substantially radially inward against said tube, said rearward bore wall axially located at a place along said bore substantially radially underneath said external cam surface and within the axial limits of the second coupling member, said biting edge means being annularly continuous and biting into said tube and making a fluid seal therewith and said forward bore wall and said rearward bore wall on opposite sides thereof closely engaging the tube, said biting edge means integrally connected to and fixedly disposed with respect to said external cam surface and said abutment shoulder and axially located at a place along said bore substantially radially underneath said external cam surface, said biting edge means prior to being radially contracted having an internal diameter substantially the same as the diameter of said second bore portion, said forward bore wall and said rearward bore wall, respectively, extending away in opposite longitudinal directions from the forward and rearward sides of the root diameter of said biting edge means and both having a diameter prior to being radially contracted greater than that of said second bore portion and thereby defining on opposite sides of said biting edge means a radial clearance space with respect to said tube which is greater than the radial clearance space between said tube and said second bore portion, said biting edge means projecting radially inwardly from said forward bore wall and said rearward bore wall and engaging said tube prior to said forward bore wall and said rearward bore wall upon contraction thereof by said second coupling member, said sleeve having its thinnest radial dimension at said rearward bore portion, said sleeve being circumferentially continuous throughout its length from said forward end portion to said rearward bore portion, inclusive.

2. A coupling connection for a tube comprising, first and second coupling members adapted to be connected together, said first coupling member having a seat, said second coupling member having an internal clamping surface, a clamping sleeve mounted in the second coupling member and having an inner bore to receive said tube, said sleeve comprising a continuous one-piece annular body and having a forward end portion to engage said seat on the first coupling member to make a fluid seal therewith, said sleeve having internally thereof an abutment shoulder against which the end of the tube abuts, said inner bore of said sleeve having biting edge means including at least one substantially V-shaped rib of a fixed depth and opposed fixed side wall means, said bore between said abutment shoulder and said biting edge means comprising a first bore portion and a second bore portion, said first bore portion disposed next adjacent said biting edge means and having next adjacent the forward side of the biting edge means a forward bore wall of a diameter substantially the same as the root diameter of said biting edge means, said second bore portion disposed between said abutment shoulder and said first bore portion and comprising substantially a cylindrical surface closely receiving the end of the tube, the longitudinal extent of said first bore portion being greater than the longitudinal extent of said at least one substantially V-shaped rib, said sleeve next adjacent the rearward side of said biting edge means having a rearward bore portion, said rearward bore portion having a rearward bore wall of a diameter substantially the same as the root diameter of said biting edge means, the longitudinal extent of said rearward bore wall being as great as the longitudinal extent of said at least one substantially V-shaped rib, said sleeve having an external surface and including an external cam surface against which said clamping surface of said second coupling member engages to contractibly force said biting edge means and said forward bore wall and said rearward bore wall on opposite sides thereof toward said tube, said external cam surface having a rearward end overlying said rearward bore wall, said external cam surface and said abutment shoulder axially spaced apart and fixedly disposed in an axial direction with respect to each other and preventing foreshortening of said sleeve to cause said biting edge means and said forward bore wall and said rearward bore wall on opposite sides thereof to contractibly move substantially radially inward against said tube, said rearward bore wall axially located at a place along said bore substantially radially underneath said external cam surface and within the axial limits of the second coupling member, said biting edge means being annularly continuous and biting into said tube and making a fluid seal therewith and said forward bore wall and said rearward bore wall on opposite sides thereof closely engaging the tube, said biting edge means integrally connected to and fixedly disposed with respect to said external cam surface and said abutment shoulder and axially located at a place along said bore substantially radially underneath said external cam surface, said biting edge means prior to being radially contracted having an internal diameter substantially the same as the diameter of said second bore portion, said forward bore wall and said rearward bore wall, respectively, extending away in opposite longitudinal directions from the forward and rearward sides of the root diameter of said biting edge means and both having a diameter prior to being radially contracted greater than that of said second bore portion and thereby defining on opposite sides of said biting edge means a radial clearance space with respect to said tube which is greater than the radial clearance space between said tube and said second bore portion, said biting edge means projecting radially inwardly from said forward bore wall and said rearward bore wall and engaging said tube prior to said forward bore wall and said rearward bore wall upon contraction thereof by said second coupling member, said sleeve having its thinnest radial dimension at said rearward bore portion, said sleeve being circumferentially continuous throughout its length from said forward end portion to said rearward bore portion, inclusive, said sleeve having a rearward annular tube supporting surface extending rearwardly from said rearward bore portion, said tube supporting surface comprising substantially a cylindrical surface having a bore diameter substantially the same as that of said second bore portion.

References Cited in the file of this patent

UNITED STATES PATENTS

| | | |
|---|---|---|
| 2,233,214 | Lamont | Feb. 25, 1941 |
| 2,452,278 | Woodling | Oct. 26, 1948 |
| 2,452,890 | Wolfram | Nov. 2, 1948 |
| 2,544,108 | Richardson | Mar. 6, 1951 |
| 2,579,529 | Woodling | Dec. 25, 1951 |
| 2,613,959 | Richardson | Oct. 14, 1952 |
| 2,640,716 | Bigelow | June 2, 1953 |
| 2,641,487 | LaMarre | June 9, 1953 |
| 2,644,700 | Woodling | July 7, 1953 |
| 2,693,374 | Wurzburger | Nov. 2, 1954 |
| 2,695,796 | Woodling | Nov. 30, 1954 |

FOREIGN PATENTS

| | | |
|---|---|---|
| 164,687 | Australia | Aug. 19, 1955 |